Nov. 14, 1961 W. J. CAMP 3,009,022

AUTOMATIC TELEPHONE INTERCEPT SYSTEM

Filed July 30, 1956 3 Sheets-Sheet 1

INVENTOR:
WILLIAM J. CAMP,
BY Kingsland, Rogers & Ezell
ATTORNEYS

AUTOMATIC TELEPHONE INTERCEPT SYSTEM

Filed July 30, 1956

INVENTOR:
WILLIAM J. CAMP,
BY Kingsland, Rogers & Ezell
ATTORNEYS

AUTOMATIC TELEPHONE INTERCEPT SYSTEM

Filed July 30, 1956 3 Sheets-Sheet 3

INVENTOR:
WILLIAM J. CAMP,
BY Kingsland, Rogers & Ezell
ATTORNEYS

United States Patent Office 3,009,022
Patented Nov. 14, 1961

3,009,022

AUTOMATIC TELEPHONE INTERCEPT SYSTEM

William J. Camp, Dallas, Tex.
(1611 Wells Ave., Northfield, N.J.)

Filed July 30, 1956, Ser. No. 600,965
12 Claims. (Cl. 179—27)

This invention relates to improvements in automatic telephone apparatus, and in particular is concerned with automatic apparatus for intercepting calls for certain dial telephone numbers.

In the past, long distance dialing throughout the nation has been from one office to several attended trunk offices before the final connection was made. Now, long distance direct dialing has been instituted in a number of systems. With this direct dialing, the originator of the call will not go through intermediate operators, but instead will dial through automatic equipment which will automatically route each call to its proper and final destination. Under this new automatic direct dialing system, it will be seen that any number change in the end office will not be called to the attention of the long distance dialer. Under such conditions, the long distance dialer may dial into the end office time after time in an effort to reach the called subscriber whose number may no longer be in operation for one of several reasons. This is a very undesirable situation, since there is a considerable loss in toll revenue through the tie-up of the line.

By means of this invention, there has been provided automatic intercept apparatus which serves to intercept calls to selected dialed numbers. Thus, where a number has been changed, disconnected, or where the status has otherwise been altered and requires some notification to the dialing party, calls for these numbers may be intercepted. Through this notification of the change of status of the end number to be dialed, the tie-up of toll lines is greatly minimized and these toll lines are, therefore, more freely usable for revenue conditions.

The intercept equipment of this invention is very adaptable and flexible in its operation. It may be located in the toll center which has access to the toll connections in the outlying offices which are served by the toll center. This office is the central location for all equipment such as recorders, and operators, and has access to the available information relative to the status of the intercepted number that is to be furnished to the dialing party. Where desired, however, the intercept equipment may be used in a local office where local intercepting is desired, as where there are a good many local number changes, lines are out of condition or where other matters effecting the status of the called party's number dictates that information be supplied to the calling party.

Through the intercept equipment of this invention, information as to the status of the called party's line may be given by recordings where the number is changed or disconnected, or switching may be made directly into an operator's trunk and the operator can verbally give this information or any other information as to a changed status. The equipment is completely independent of the status of the called number whether it be busy, temporarily or permanently disconnected, or whether it is upon a restricted service or other abnormal status.

A signal feature of this invention is that it is equipped with dead level switches for the hundreds, tens and units digits so that all numbers appearing after these dead-level digits may be switched out of the apparatus. This switching mechanism, when operated, allows the call to go through to the called number in normal fashion and keeps the automatic apparatus from operating relays uselessly which prevents wear and tear on the system. When the switches are not operated, individual numbers may be very simply placed upon intercept by a patch cord system which allows very broad adaptability and flexibility in patching 9,999 different combinations.

The automatic apparatus is further provided with an unequipped hundreds switch. Through this mechanism and the ten switches employed for the hundreds digits from one to zero (in telephone parlance, this is equivalent to the numeral 10), there is provision made for intercepting calls when these numbers have not been placed in service. Thus, if a calling party dials such a number where the unequipped hundreds switch is operated, the apparatus will automatically intercept and after the completion of the dialing provide for a recorded announcement that there is no such number or alternatively, this may be done by an operator.

This apparatus comprises two main pieces of equipment designated as a computer section and a drive section. The computer section having ten ranks of jacks with ten jacks in each rank is provided for the hundreds and ten digits of the dialed number on one side of the apparatus, while a similar set of ten ranks having ten jacks in each rank is provided for the units and stations digits. Through the use of uni-directional patch cords, various number combinations may be patched to provide up to 9,999 different numbers which may be placed upon intercept when the apparatus is completely equipped. The second main portion of the equipment comprises the drive section, one of which is used for each one of the hundreds digit ranks in the apparatus. The drive section comprises various relays and magnetic impulse counters to effectuate the automatic intercepting of calls for selected numbers, switching to dead level for desired series of digits and switching to the unequipped hundreds signalling condition.

This automatic apparatus is further provided with a digit absorbing feature to accommodate the called numbers which utilize the four digit local numbering plan. Thus, this apparatus may be employed for numbers in the nationwide 2–5 numbering plan, as example, the number PR 3–1234 or local numbers which employ only four digits such as 1234. This provides for flexibility and adaptability in the apparatus so that it may be employed in full offices serving local outlying offices in small towns or employed in such local offices directly.

This apparatus is extremly adaptable and flexible and may be utilized with any existing telephone equipment in a very simple installation. As mentioned above, it is suitable for employment in toll offices which serve a number of outlying local offices or for employment in a local office itself. There is a minimum of connections into the trunk lines in which this automatic equipment may be employed and as a result, the automatic equipment may be very simply incorporated into existing telephone apparatus without a great change in wire or other rearrangements.

Accordingly, it is a primary object of this invention to provide automatic equipment for use in telephone systems which can intercept calls for certain dialed numbers.

It is a further object of this invention to provide automatic equipment for use in telephone systems which will intercept calls for certain selected numbers and inform a calling party of a change in status of the called number.

Another object of this invention is to provide automatic equipment for intercepting calls for selected numbers in a telephone system and to provide for digit absorption.

Another object of this invention is to provide automatic telephone equipment which will intercept calls for certain selected numbers regardless of the condition of the number called.

Still another object of this invention is to provide automatic telephone equipment which will intercept calls for selected numbers and in which the selection may be made by means of a patch cord system in a very expeditious manner which is extremely simple in operation.

Still another object of this invention is to provide automatic telephone equipment for intercepting calls for certain desired numbers which has provisions for rendering all numbers in certain hundreds, tens or digit series inoperative in the equipment through the use of a dead level switching mechanism.

Yet a further object of this invention is to provide automatic equipment for intercepting calls for certain numbers in which the equipment can be rendered inactive through dead level switching mechanisms when certain number series are dialed.

Still another object of this invention is to provide automatic telephone equipment for intercepting calls for certain selected numbers utilizing a switching mechanism which will inform the calling party that certain numbers in a selected series are unequipped or that there is no such number.

Yet a further object of this invention is to provide automatic telephone equipment having intercept features which is made of standard components and is very flexible in its operation and installation, such that it can be utilized in conventional telephone facilities.

Still another object of this invention is to provide automatic telephone equipment having intercept features which are rugged in construction and flexible in operation and relatively inexpensive in cost.

Further objects of this invention will appear in the detailed description which follows and will be further apparent to those skilled in the art.

Reference will now be had to the accompanying drawings showing a preferred embodiment of this invention. It is to be understood that these drawings are for the purpose of illustration only, and that the invention is not limited thereto. In the drawings.

*Detailed description of the drive section*

Figure 1:
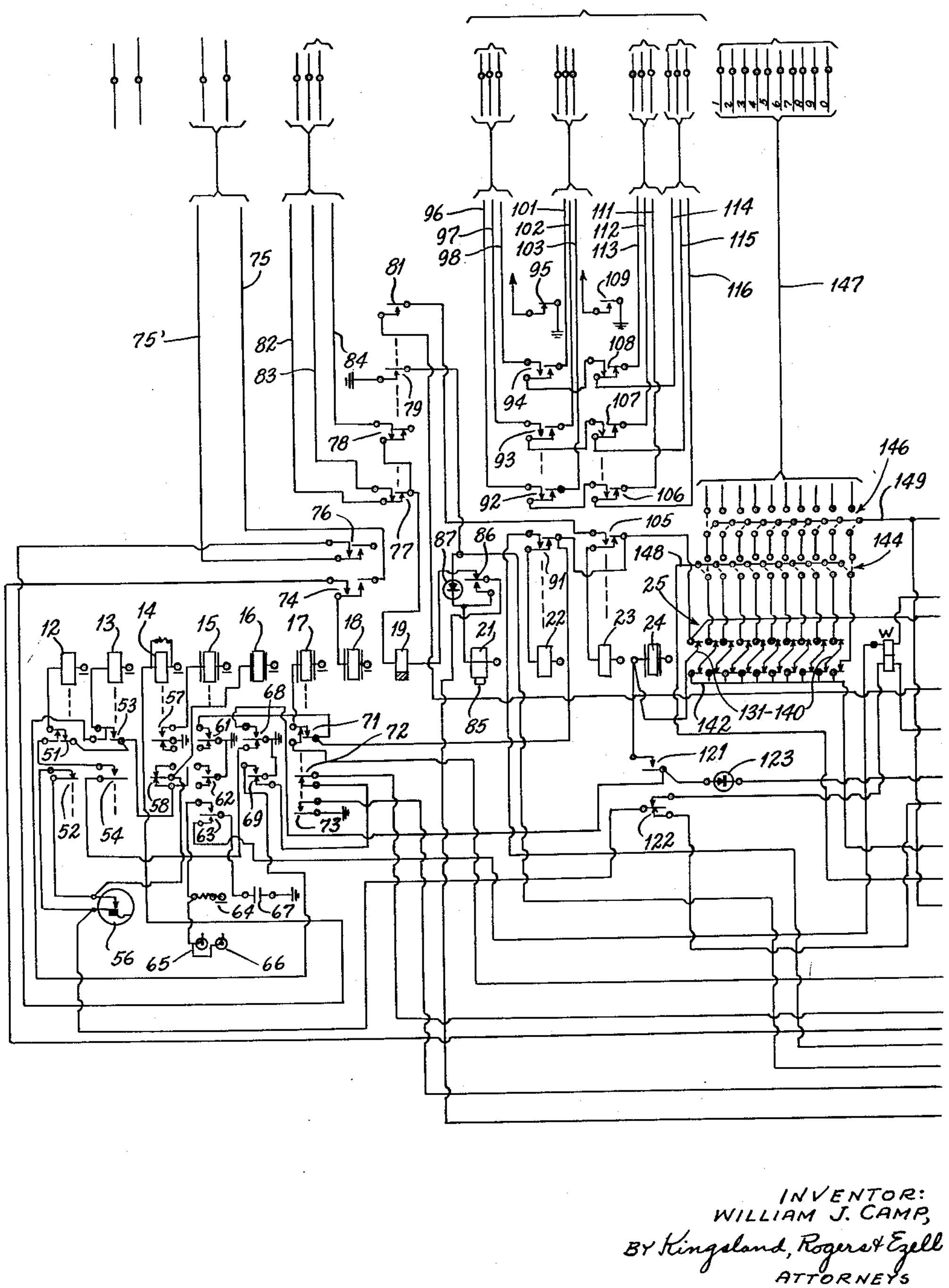
FIGURE 1 is a schematic diagram of the left end of the drive section.
Figure 2:
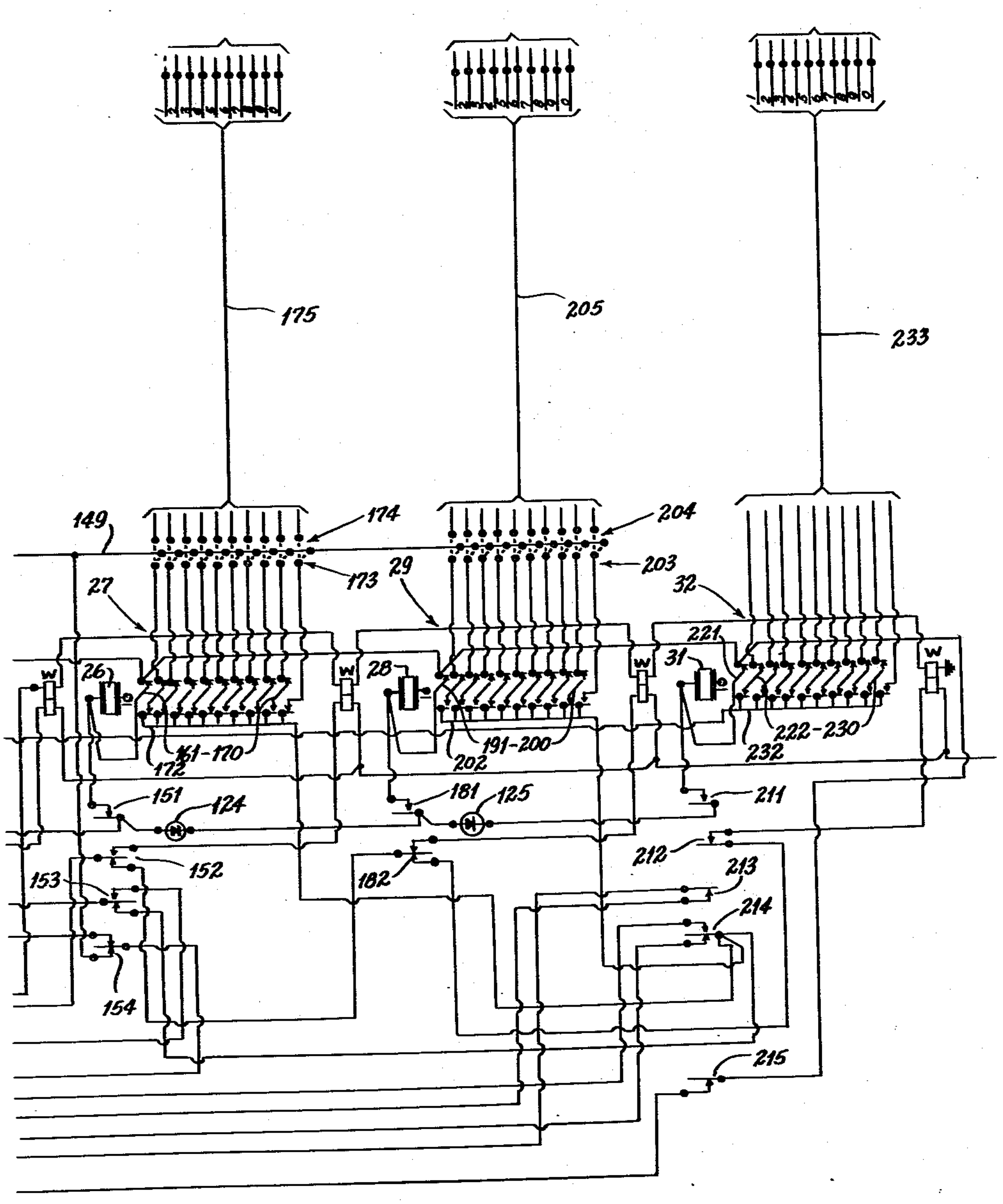
FIGURE 2 is a schematic diagram of the right end of the drive section.

There will be given below a detailed description of the major components in the drive section and the connections from the pulse and trunk leads or other connections to recorders or to the operator's circuit from this section. These components will be described looking from the left end of the equipment toward the right end.

For convenience, the designation of the major components and their functions are listed below:

| Component | Function |
|---|---|
| Digit absorbing relay 12 | Absorber for 2–5 numbering (X) digit of office code. |
| Digit absorbing relay 13 | Absorber for 2–5 numbering (X) digit. |
| Digit absorbing relay 14 | Follows dial pulses from trunk repeaters, selectors or connectors. |
| Hold relay 15 | Hold (ground). |
| Series relay 16 | Counter for dial pulls controlling ground into counters and equipment. Also counter for the 2–5 numbering of the (X) digit. |
| Unequipped hundreds relay 17 | Cut-through action should a hundred level be dialed that is not equipped in the switching equipment. |
| Dead levels relay 18 | For lock-out of the remaining dial pulls into the switch should the digit be dialed that is no possible intercept digit. |
| Test battery relay 19 | Opens battery to the remaining switches so only one drive section may test the computer board and patch cords for possible intercept numbers. |
| Cut-off relay 21 | Releases the test battery relay so the next trunk may test for intercept. |
| Intercept hundreds relay 22 | Cuts the audio paths into a channel of recorder equipment or to operator office trunks for intercept information on "no such number" calls. |
| Intercept number relay 23 | Cuts the audio paths into an operator service trunk or recorder equipment for number change information. |
| Hundreds chain relay 24 | Hundreds chain relay for control of the pulse lead into the hundreds counter. |
| Impulse counter 25 | Hundreds impulse counter. |
| Tens chain relay 26 | Tens chain relay for control of the pulse lead into the tens counter. |
| Impulse counter 27 | Tens counter. |
| Units chain relay 28 | Units chain relay for control of the pulse lead into the unit counter. |
| Impulse counter 29 | Units impulse counter. |
| Station chain relay 31 | Station chain for control of the pulse lead into the station counter and cut-through action of the drive section after the fourth digit has been recorded. |
| Impulse counter 32 | Station impulse counter. |

The digit absorbing relay 12 is provided with a make-break spring 51 and a make spring 52, while the second digit absorbing relay 13 is similarly provided with a make-break spring 53 and a make spring 54. A switch 56 is associated with these digit absorbing relays for cutting into or out of the circuit this feature of the apparatus.

The dial relay 14 has two sets of springs, one of which is the spring 57 that is a make spring adapted to be connected to ground while the other is a break spring 58. The hold relay 15 has a spring 61, which is a make spring adapted to be connected to ground, and a second make spring 62, and a third make-break spring 63 is further provided. The make contact of the spring 63 is connected to a battery 64 and to lamps 65 and 66. The armature of the make-break spring 63 is further connected to a condenser 67 and then grounded.

The series relay 16 is provided with two spring sets. The first of these, 68, is a make-break spring with the armature grounded, while the second is also a make-break spring having its armature connected to the same ground. The second spring set is designated by the numeral 69.

The unequipped hundreds relay 17 has three sets of springs designated 71, 72 and 73. The spring set 71 is a make-before-break, while the spring 72 is a break spring and the spring 73 is a make spring with the armature connected directly to ground.

The dead levels relay 18 has a make-before-break spring set 74, the armature of which is connected to a hold lead in a trunk line designated 75. A second make-before-break spring set 76 is also provided in the dead levels relay 18 in which the break spring is connected to a pulse lead 75′ leading to a trunk line.

The test battery relay 19 is provided with four spring sets which are spring sets 77, 78, 79 and 81, the last two of these being single make springs. The spring set 77 is a make-before-break spring set in which the springs are connected to two leads 82 and 83, the first of which leads to the test battery associated with the trunk leads 75 and 75′, while the lead 83 is connected to the test battery of another trunk and may be multipled over with another lead 84 connected to the break spring of spring set 78.

The cut-off relay 21 is connected to a dashpot 85 for slow release and has a break-make spring set 86. Connected to the make spring and also to the coil of the cut-off relay is a germanium diode 87 which permits only unidirectional flow to these components for a purpose later on to appear.

The intercept hundreds relay 22 is provided with five spring sets designated 91, 92, 93, 94 and 95. The spring set 91 is a make-before-break spring set, as are also spring sets 92, 93 and 94. Each of the break springs in spring sets 92, 93 and 94 are connected to separate leads 96, 97 and 98, respectively, leading to selectors or connectors in the switchboard with which this apparatus is associated. The break spring of spring set 95 is connected to the lamp 65 for visual indication purposes. Three leads 101, 102 and 103 lead from an intercept recorder in the switchboard to the armatures in spring sets 94, 93 and 92, respectively. This is for the purpose of providing a recording to make a desired announcement when certain numbers are intercepted.

The intercept number relay 23 which cuts the audio paths into an operator's service trunk or recorder equipment for number change information is equipped similarly to the intercept hundreds relay 22. Thus, it also has five sets of spring sets designated 105, 106, 107, 108 and 109. The armatures of spring sets 106, 107 and 108 are connected into leads 111, 112 and 113 leading to lines for the intercept operator. The make contact of spring set 109 is connected to the lamp 66 for visual signaling. The make springs of the spring sets 108, 107 and 106 are connected to tip ring and sleeve leads 114, 115 and 116, respectively, connected to a trunk line.

The hundreds chain relay 24 has two spring sets designated 121 and 122. The 121 spring set has a make spring in which the armature is connected to a germanium diode 123 for unidirectional flow and which is connected in series with two other germanium diodes 124 and 125 for a purpose more fully to appear. The second spring set 122 is a make-break spring set.

The magnetic impulse counter 25 has ten stepped springs designated 131 through 140. The bottoms of the springs 132 through 140 are in the normally broken position from a common strap 142, while the tops of the springs are in the normally made position with individual leads associated with nine switches in a ten switch set designated 144 which controls the unequipped hundreds operation. The tenth switch in this set is connected to a make contact corresponding to the digit zero which is multipled into the common strap 142 at the bottom of the magnetic impulse counter.

Connected above the ten switch set 144 for the unequipped hundreds is a ten switch set designated 146 for the hundreds dead level operation. These switches are connected to a cable schematically shown at 147 into the computer section of the hundreds relay, as more fully shown in FIGURE 3.

The tens chain relay 26 has four spring sets designated 151, 152, 153 and 154. The first of these is a make spring, while the next three spring sets 152, 153 and 154 are all make-break spring sets. The tens chain relay like the hundreds chain relay 24 is connected to the first spring of the associated impulse counter 27.

The impulse counter 27 for the tens chains has ten stepped springs designated 161 through 170 with the bottom make springs being connected in multiple to a strap 172 and with the top break springs being connected to individual lines in a ten line series designated 173. These lines are adapted to be switched into and out of operation by a set of ten separate switches generally designated at 174 for the tens dead level operation. On the other side of these switches, a cable 175 comprising ten lines is connected to the tens level switches in the computer section 42, as more fully shown in FIGURE 3.

The units chain relay 28 is provided with a make spring 181 and a make-break spring set 182. The coil of this relay, as in the other chain relays, is connected to the first break spring in the units impulse counter 29. This impulse counter also has ten make-break stepped springs designated 191 to 200 with the make springs being adapted to be connected in common to a strap 202. Each of the break springs is associated with leads generally designated by the numeral 203 which lead to a set of ten switches designated 204 for the operation of the units dead level. From these switches, a cable comprising ten lines and generally designated 205 leads to the computer section and the individual relays in the units relay section designated 46 in FIGURE 3.

The station chain relay 31 has five sets of springs designated 211, 212, 213, 214 and 215. The first two of these springs 211 and 212 are make springs, while 213 is a break spring, as is also the spring set 215. The spring set 214 is a make-break spring set.

The magnetic impulse counter 32 has its first spring 221 connected to the coil of the station chain relay 31 and is further provided with remaining break-make stepped springs 222 through 230. As in the other impulse counters, the make springs are adapted to be connected in common to a strap 232 while the break springs are associated with lines in a cable 233 leading directly to the ten files of switches in the hundred switch set 45 in the computer section, as more fully shown in FIGURE 3.

*Detailed description of the computer section*

The computer section is divided into a left hand section corresponding to the hundreds and tens digits of the telephone numbers, while the right hand section comprises the units and stations of the telephone numbers. The jack bank 41 is colored black, while the right hand bank 44 is colored red to provide for proper reference when a patch cord 48 is utilized to patch between the two sections for the desired number. The plug 52 of the patch cord being black is designed to mate with the black jacks of the bank 41, while the red plug 53 mates with the red jacks and bank 44. This assures proper orientation of the patch cord for the unidirectional flow provided by the germanium diode 51.

The bank of jacks 41 comprises one hundred jack sets in number. Each one of these jack sets is in the form of six individual jacks as shown at 47, so that actually six hundred are provided in the bank 41. It is to be understood, however, that, instead of using six jacks for each jack set, there may be variable numbers depending upon the desired service load to be used in this apparatus.

Figure 3:
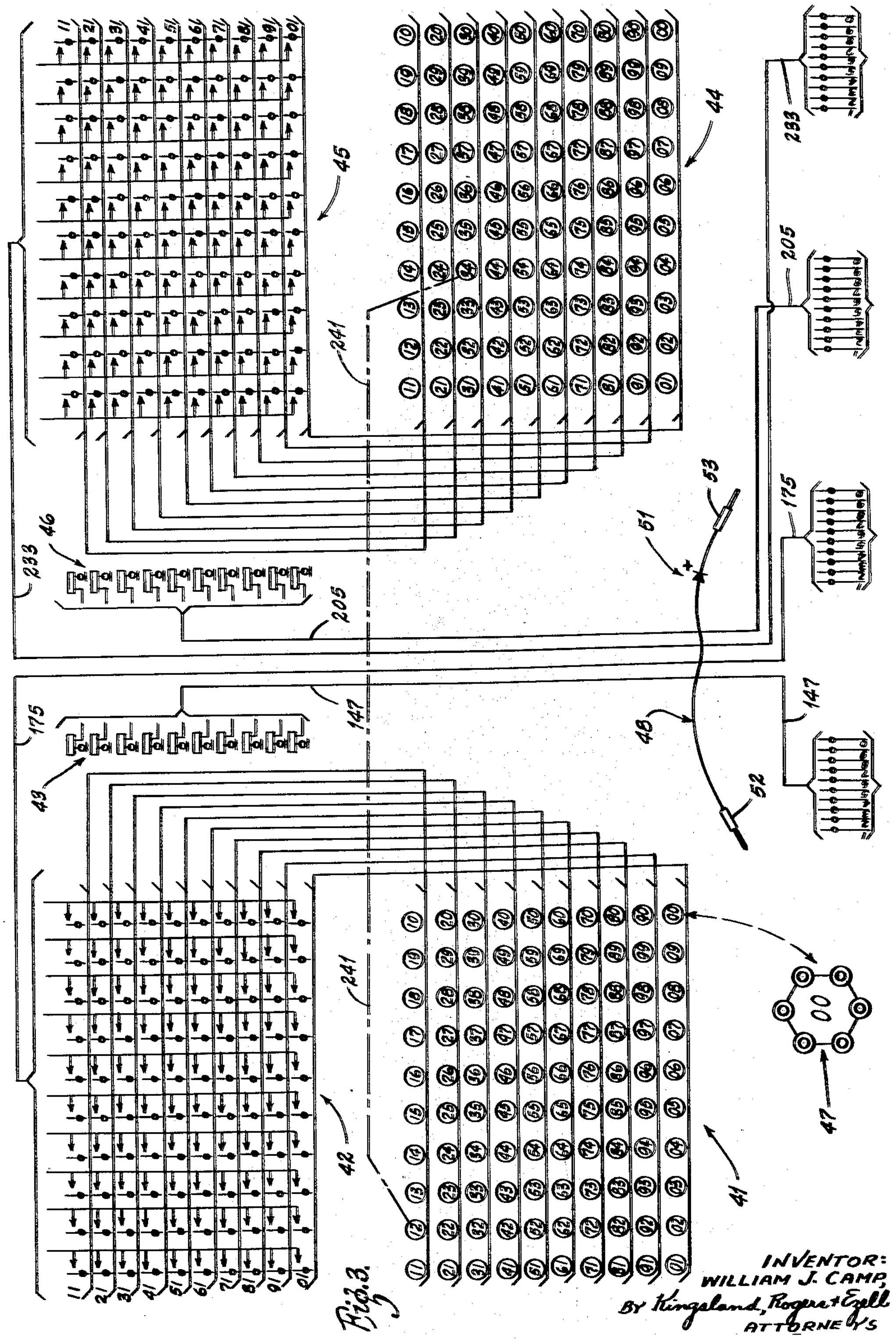
FIGURE 3 is a schematic diagram of the computer section.

The bank of jacks 41, as shown in FIGURE 3, is divided into ten vertically spaced horizontal ranks. Thus, for the one-hundred series in the first and top rank, the numbers run from 11 to 12, 13, etc., with the tenth number in this rank being the number 10 immediately succeeding the number 19. Similarly, the second rank is numbered 21, 22, etc., up through 29 and 20. This numbering series continues down to the bottom rank which is numbered from 01, 02, through 09 and 00.

The hundreds relays generally indicated at 43 in the computer section are ten in number. The first of these is one-hundreds (100's) relay which is associated with the first switch in the hundreds dead level set of switches 146 and similarly to the first switch in the unequipped hundreds set of switches 144 through the cable 147. This same sequential association is carried through for the relay for the two hundreds (200's), etc., up through the nine hundreds and zero one-hundreds in this set of ten relays 43. Thus, these relays are separately connected to the hundreds levels through the remaining switches in the hundreds dead level switch set 146 and the unequipped hundreds switches set 144 through the separate lines in the cable 147. Each one of the relays is designed to operate separately the set of ten switches in its switch rank in the switch set 42. In the first rank of 10 switches, it will be seen that all of the switches have make springs and are adapted to be connected with the first rank of jacks in the bank 41. This same relation holds for the relay and second rank of switches and so on down to the last rank, which will be numbered 01, 02, etc., through 09 and 00.

The left hand section of the computer section thus provides for the selection of the hundreds and tens digit of the number to be placed upon intercept. Thus, for the number 1234, the black plug 52 of the patch cord would be placed in the jack 12 in the first rank of the jack bank 41 with the red plug 53 to be placed in the jack 34, corresponding to the unit 3 level and the station 4, of the jack bank 44 for the right hand computer section, as will be more fully described. In this example, the numeral 1 corresponds to the hundreds level and the numeral 2 in this number corresponds to the tens level, with the hundreds running horizontally in ranks in the jack bank and the tens running vertically in files.

For the right hand section of the computer section, the arrangement is designed for the selection of the units and station numbers, which, for the example above, would be the digits 3 and 4, respectively, for the number 1234. The jack bank 44 is similarly arranged to the jack bank 41. Thus, in the first rank there are ten jacks, similar to the jack set 47, and numbered 11, 12, etc., through 19 and 10. Likewise, the last or tenth rank at the bottom of the bank is numbered 01, 02, etc., through 09 and 00.

For the selection of the proper rank of the units level to be operated, the units relays comprising 10 in number in the relay set 46 are provided. The first relay is designed for the selection of the first rank of jacks, while the last relay for the zero units is designed for the bottom rank of jacks. Each of these relays is connected to a separate line through the cable 205 to the separate switches in the ten switch set 204 for the unit dead levels.

The set of one hundred springs or switches in the switch set 45 is similarly arranged in horizontal ranks and vertical files to those described for the spring set in the bank 42. Thus, for the control of the station number operation, each file vertically disposed has a separate line connected to each one of the vertical springs in the separate file. This line is then connected to the cable 233 directly to the contacts associated with the springs in the magnetic impulse counter 32 for the station digits. It will be noted that this connection is directly into the magnetic impulse counter and that no station dead level switches are employed, as dead level operation for the station digits would be a useless feature.

For the example of the intercept number 1234, the units digits 3 and the station digit 4 would be pulsed into intercept by the insertion of the red plug 53 into the jack 34 in the units and station bank 44. This complete patching arrangement for the example may be seen by the reference to the line 241 in FIGURE 3 extending from the jack 12 in the bank 41 to the jack 34 in the bank 44. This represents a complete patching with a patch cord 48 for the number 1234 to be placed on intercept.

*Operation*

Operation of the components for the computer-intercept apparatus is commenced through the usual off hook signal. Thus, ground from the trunk lead 75′ in FIGURE 1 will be offered through the spring 76 of the dead levels relay 18 to the coil of the dial relay 14 for its operation. When this ground potential appears at the coil of the dial relay 14, this relay operates and is in condition to follow the off hook and on hook conditions presented through the trunk.

When the dial relay 14 operates, the spring sets 57 and 58 will make and break respectively. The making of the spring set 57 presents ground to the coil of the hold relay 15 to cause its operation. The hold relay 15 is a slow release relay and remains operated through the pulsing of each digit as offered into the dial relay from the trunk. The hold relay, in its operation then causes the operation of the spring sets 61, 62 and 63.

When the hold relay 15 operates, it offers ground from the made spring contact of spring set 61 through the armature of spring 71 in the unequipped hundreds relay 17. From there ground is presented through the armature of the spring set 91 in the intercept hundreds relay through the armature of the spring set 105 in the intercept number relay and on into the number 1 break spring of each of the four impulse counters 25, 27, 29 and 32. This ground appearing at each of the impulse counter break springs 131, 161, 191 and 221 will operate each of the four chain relays associated with the impulse counters. Thus, the hundreds chain relay 24, the tens chain relay 26, the units chain relay 28 and the station chain relay 31 are all caused to be operated. These chain relays are slow release relays and are a control for the pulse leads into the windings of the impulse counters to record or register the incoming digits upon the proper relay in the order received from the connected equipment.

Each of the chain relays will then operate with the ground from the hold relay 15 appearing in their coils. Upon operation of the first chain relay in this series, i.e., the hundreds chain relay 24, the pulse lead from the dial relay 14 will be closed into the pulse winding of the hundreds impulse counter. Thus, each time the dial relay 14 drops out in following the incoming on hook and off hook signals from the connected trunk, this ground is fed directly from the main spring set 62 of the hold relay and is fed directly through the spring set 58 of the dial relay to the closed contacts of switch 56 and through the made contact of the spring set 122 in the hundreds chain relay and thence into the winding of the impulse counter 25. When the switch 56 is in the open position, the pulse lead is transferred into the two 2–5 digit absorbing relays 12 and 13 for the absorption of the first or X digit of the office code as will be explained in detail hereinbelow in connection with the operation of this drive section.

Thus, each time the short is removed from the dial relay 14 and this relay drops out, it will drop the pulsing ground into the hundreds chain relay 24 and then into the pulse winding of the counter 25 which will step one step for each impulse received in its associated winding. If the digit of 5 is dialed from the calling dial, the dial relay 14 will record five impulses upon the impulse counter 25. Thus, each impulse of a particular digit will be registered upon the impulse counters in the numerical sequence.

*Holding action by the chain relays from the series relay*

The very first pulse from the calling dial operates the first break spring in the impulse counter 25 and removes the operational ground from the hundreds chain relay through the hold relay 15. In order to hold this hundreds chain relay during all the pulses for the particular digits, the chain relays must be held in an operated position. This is accomplished by the series relay 16 which is in an operated position during the recording of each dial call from the calling station and is let out after all pulses have been recorded for the particular dial call. This holding action of the series relay 16 during the incoming pulsing holds ground into the coils in the chain relays through unidirectional diodes 123, 124 and 125.

Thus, the hold ground from the hold relay 15 that first operated the hundreds chain relay is opened upon the first pulse from the calling dial, and the holding ground is then transferred into the winding of the chain relay through the main contacts of the spring set 121 which receives ground from the series relay 16 through the main contacts of the spring set 68 as long as the dial pulses are received to keep the series relay operated. As mentioned previously, the series relay is a slow release relay which provides for this operation.

The three unidirectional diodes 123, 124, and 125 are ahead of the series relay 16 in order to block the forward ground that is still appearing in the remaining impulse counters 27, 29 and 32 and to keep this ground from the hold relay. If these diodes were not present, the holding action of each impulse counter through the number 1 break springs 161, 191 and 221 would also hold all the chain relays and the pulsing would not be transferred into the winding of the proper counter for the proper sequence of operation.

With the operation of the chain relays and counters as above described, it will be seen that each sequence of operation will be in order of reception of each dialed digit of the standard telephone numbering system. The impulse counter 25 will register the hundreds digit. The impulse counter 27 will register the tens digit, the impulse counter 29 will register the units digit and the last and fourth impulse counter 32 will register the station digit in the proper order as received from the calling dial.

*Drop-out of the hundreds chain relay after recording the hundreds digit*

After the hundreds digit has been dialed and the pulses have been recorded, the series relay drops out and ground will no longer appear in the coils of the chain relays. Thus, these chain relays have had the ground opened through the number 1 break spring of a particular impulse counter. After the hundreds digit is dialed, the hundreds chain relay 24 will drop out and this action will also take place for the proper chain relay as the succeeding tens, units and station digits are dialed in the order of the dialed digits as received from the calling dial.

Accordingly, after the hundreds impulse counter 25 has recorded the first dialed digit and the hundreds chain relay 24 has dropped out, the pulse lead will then be transferred into the second chain relay which is the tens chain relay 26. Upon drop out of the hundreds chain relay, the spring set 122 will transfer the pulse lead through the made contact in the spring set 152 and into the coil winding of the impulse counter 27 for the recording of the tens digit. With this transfer, the next digit recorded will be recorded upon the tens impulse counter.

*Pulsing and drop-out of the tens chain relay after the recording of the tens digit*

The second digit received in the drive section would be the tens digit and will, as above mentioned, be registered upon the second impulse counter 27. The tens impulse counter like the hundreds impulse counter previously described, will then register the second or tens digit upon the impulse counter spring. As in the case of the hundreds chain relay, the pulse ground through the break spring 161 of the impulse counter will release the pulse ground from the hold relay, but the tens chain relay 26 is held in operation through the action of the series relay 16. This holding action is through the unidirectional diode 123 and into the made spring set 151 and into the relay coil.

Once the tens digit has been fully registered and the pulsing is ended, the series relay 16 drops out and the tens chain relay 26 will also drop out. In the drop-out of the tens chain relay, the pulse lead in spring set 152 is transferred from the coil associated with the impulse counter 27 for the registering of the tens digit into the made contacts of the spring set 182 associated with the units chain relay 28 and from there into the coil of the magnetic impulse counter 29 for the units digit. Here it should be mentioned that the unidirectional diodes ahead of the last recorded digit prevent the ground in the next relay from holding the last recording chain relay for the digit concerned.

*Pulsing and drop-out of the units chain relay after the recording of the units digit*

After the tens chain relay 17 has been released the pulse lead, as above-mentioned, is directed into the coil associated with the units impulse counter 29. The units chain relay 28, as in the case of the previously described hundreds and tens chain relays, is operated from the pulse ground offered upon off hook condition into the hold relay 5 through the number 1 break spring 191 of the impulse counter 29.

With the pulse lead from the dial relay 14 directed into the winding of the unit impulse counter, this impulse counter is ready for the registering of the unit digit. The units chain relay 28 is held in operation by a circuit completed through the relay coil through the made set of contacts in spring set 181 into the diodes even after the first pulse has been dialed breaking the spring contact 191. After the completion of the dialing of the units digit, the unit chain relay 20 will be released and will transfer the pulse lead into the station impulse counter 32 as described below.

*Pulsing and drop-out of the station chain relay after recording of the station digit*

After the unit digit has been recorded upon the unit impulse counter 29, the pulse lead is transferred into the winding of the impulse counter 32 through the made contacts of spring sets 212 associated with the station chain relay 31 and the contacts in spring set 182 associated with the units chain relay after the same has released. With this circuit arrangement the station or last digit of the standard four digit telephone number is registered upon the impulse counter 32.

The drive section has now registered the four digits of the called station upon the four impulse counters as these digits are received from the calling station through the trunk repeaters in toll operation or from the selectors or connectors or links if local operation is to be employed.

*Operation of the computer section*

In order to place any standard telephone number upon intercept, the proper digit for the hundreds, tens, units and stations of the intercept number are first determined. Then the patch cord 48 is inserted into the hundreds and tens bank of jacks 41 with the plug 52 being inserted in the appropriate jack of this bank and then the plug 53 is inserted into the appropriate right hand bank jack for the units and station digits. Thus, the patch cord connects the hundreds and tens into the units and stations for the intercept number. In this manner, proper continuity and alignment for the operation of the drive section is effected and reversal or cross-connections are prevented. Through the employment of these different colored plugs and also the unidirectional diode 51 in the patch cord, reversal in multiple numbering is obviated and the computer will not give intercept on cross conditions.

The computer section is designed for 1,000 numbers regardless of the number of exchanges or dial offices that it is connected into or serving. For example, if ten one hundred line dial offices are to be connected into the computer section, each would have a separate hundreds relay associated with it in the relay set 43 and would be each served by the ten relays in the set of unit relays 46. In like manner, if two five hundred line offices were to be desired to be served by the computer section, each office would have five relays associated with it in the relay set 43 and the full ten relay set for the unit relays 46. By this means, up to 1,000 lines may be intercepted and the computer section may serve anywhere from one to ten offices.

With the patch cord connected between the hundreds and tens section into the units and stations section, the computer section, as a whole, may be termed to be looking into the drive section for ground signaling for the chosen intercept number and will be responsive to the proper action of the drive section relays in intercepting the selected number when the calling dial pulses the corresponding four digits which are on intercept. In this condition, the hundreds relays in the relay set 43 are now looking into the hundreds impulse counter 25 in the drive section. Each of the ten relays are directly wired to negative battery and should ground from this impulse counter appear at the proper relay winding in direct correspondence to the digit registered upon the hundreds impulse counter, the proper relay in the relay set 43 will operate.

In a like manner, the unit relays in the unit relay set 46 are connected to negative battery at one side of the coil windings and are then connected directly into the units impulse counter through the cable 205. Should a ground condition appear at the units impulse counter 29, the unit relay corresponding to the digit registered on the units impulse counter will operate.

For the purpose of example, we shall assume that the telephone number 1111 is placed upon intercept in the computer section and that the connecting equipment has pulsed the combination of the digits 1111 into each of the hundreds, tens, units and station impulse counters. In this case, the following action will follow and the call for the telephone number will be transferred into intercept for either the recorder or the operator type of service by the two intercept relays. When the number 1111 has been dialed, the drive section, as above-described, will have registered the four ones upon each of the four impulse counters 25, 27, 29 and 32 for the hundreds, tens, units and stations, respectively. On the conclusion of the pulsing from the station digit, the station chain relay 31 will drop out. As the station chain relay 31 drops out, ground is presented through contacts of spring set 215 through the contacts 86 of the unoperated cut-off relay and through the coil of the test battery relay 19. Test battery relay 19 is fed negative battery from the spring set 78 through the lead 84 from the test battery connected to the next trunk and from the last equipped drive section in any one group. It is this battery feed arrangement and the spring sets 77 and 78 which operate the test battery relay and open the same battery to the remaining test battery relays in the other drive sections in order hat only one drive section can send into and read the computer section at any one time. The ground presented to the test battery relay is that which is multiplied to each of the first spring contacts in each of the impulse counters and to the ground associated with the spring set 61 for the hold relay 15. When a test battery relay operates, it will cause ground potential to be sent into the impulse counters for operation of the hundreds and units relays 43 and 46 in the computer section corresponding to the proper digits as will be described below.

*Operation of the computer section in recording the intercept number*

After the test battery relay 19 is operated, ground will be presented from the spring set 79 through the spring set 214 associated with the station chain relay and from there into each of the straps connecting all of the break contacts 131 to 140 for the hundreds impulse counter 25, the springs 161 through 170 for the tens impulse counter 27, and the springs 191 through 200 for the units impulse counter 29. This is through the straps 142, 172 and 202 for each of these impulse counters, respectively. No ground is presented to the strapping 232 for the stations impuse counter 32.

With ground now being presented to the three straps of the first three impulse counters, each of which has recorded the digit 1, the following action will take place in sequential order. The ground now standing on strap 142 in the hundreds impulse counter 25 will be looking at the hundreds relay set 43 in the computer section corresponding to the digit recorded upon the counter and in the example of the number 1111 this will be in the bottom of spring 132 and the top thereof through the first line in cable 146 to the first hundreds relay 1 in the relay set 43 in the computer section. The operational ground found in the lower make springs from the common strap in the impulse counter is only offered into the circuit from the test battery relay 19 for the duration of the operation of this relay. By this chain action, the only drive section that can operate the relays within the computer section and read the intercept number set up by the patch cord is the first drive section that has completed its four digit recording. When and during the time the drive section is connected into the computer section for operation, that drive section only can read the computer section. Through this method of operation, any number of drive sections can be served by one computer section.

As ground is presented to the first relay in the hundreds relay set 43, this relay corresponding to the digit 1 operates and in so doing will close the ten make springs or switches in the first rank of the switch set 42. Since only the one hundred relay for the digit 1 operates from the digit registered within the impulse counter 25, the one hundreds row of tip jacks are now connected into the spring stack of the one hundred relay.

With a first relay of the hundreds relay set 43 in the operated position, the ten wire cable 175 from the tens impulse counter is now connected directly into the springs of the first relay in the hundreds relay section 43. Ground is presented when the tens digit 1 is dialed through the first line of this cable from the impulse counter through the top and bottom of spring 162. In this manner, ground is presented to the first file of jacks through the spring set 42. Thus, ground is in the jack bank 41 corresponding to the hundreds and tens digits of 1–1 from the calling station or calling equipment. From the ground present in the 1–1 jack, it will be presented through the patch cord into the right hand section for the units and station digits 1–1.

The separate relays in the unit relay set 46 are operated from the same source of ground as the hundreds relays through the closing of the test battery relay 19 which presents ground to the strap 202 at the bottom of the units impulse counter 29. The ground for the unit digit 1 will pass through the make contact of spring 192 at the bottom thereof through the top of the spring to the first line in the cable 203 and thence to the first relay in the relay set 46 to operate the same. Upon operation of this relay, ground will be presented by the patch cord from the hundreds impulse counter into the jack position of 1–1 in the bank 44 and will appear in the first unit relay spring stack in the number 1 position.

This ground is then presented to the first line of the ten wire cable 233 directly into the station impulse counter through the top of the spring 222 to the bottom make contact and into the strap 232. Since all of the impulse counters have registered the four digits of the number 1111 from the calling station in the proper order, the in and out path for the computer section is completed by the action of the drive section. Thus, by this operation the drive section may be considered as a sending and receiving equipment and the various paths through the telephone numbering system are to be considered as the computer section function.

*Cut through action intercepting a telephone number*

As indicated above, the four digits of the telephone number 1111 have been registered and a direct path has been provided for the drive section into the computer section for sending and receiving. The direct ground that operated the proper hundreds relay and which is standing in the spring stacks of the hundreds relay and upon the ten cable 175 is now within the station impulse counter strap 232 and from there is presented into the spring set 81 of the test battery relay 19 which is in the operated condition. This ground is presented to the make before break spring set 105 of the intercept relay number 23 and causes the operation of this relay. The other end of the coil of the relay is connected to negative battery and a completed circuit is presented from the drive section through the computer section and back into the drive section.

When the intercept relay has operated, the trunk, selectors, connectors or any other combination of audio leads that may be required are closed into either an operator's intercept trunking equipment or into any type of recorder announcing equipment by the closing of the three sets of make before break spring sets 106, 107 and 108 in the intercept relay number 23. The springs are make before break in each one of these sets so the calling trunk or equipment will not drop out or release during the transfer of the audio paths from one type of switch into the intercept trunk or recorder equipment and it will be understood that any type of audio circuit may be transferred in a like manner.

Once the intercept relay number 23 has operated, it will lock into a ground through the spring set 95 presented directly into the coil of the relay 23 from the holding ground from the hold relay 15 through the spring set 62 and the relay will remain in the operated position until the inward dialing equipment is returned to an on hook condition.

When the relay 23 has operated, the audio path may be closed from the tip ring and sleeve of the trunk leads 114, 115 and 116 through the operated spring sets 106, 107 and 108 of the intercept relay 23 to the leads 111, 112 and 113 for the intercept operator, or a recording announcement. Thus, the audio path has been transferred into the operator trunk and the information or procedure for the intercept information may then be executed by the operating personnel.

As stated above, the drive sections serving any number of trunks, selectors or connectors may be employed with only one computer section with only one set of patch cords for the various dialing offices involved in the system. To provide for this operation, a form of allotter system is employed to prevent one set of equipment such as the trunks from reading a condition that might have been intended for another trunk. For example, where ten trunks are working into one computer section and an inward call from each of two or three or these trunks is progressing along the chain of digits in the different drive sections in uniform manner, but no two trunks are dialing the same digits into the drive section, then if all trunks are permitted to test at the same or nearly the same time, one trunk might read a combination of digits intended for intercept although that particular trunk did not dial the intercept digit. In order to obviate this condition, only one trunk is allowed to read into the computer section at any time and the test battery relay 19 is designed to open the remaining trunk selectors or connectors which are employed during the time it is operated on ground from its own drive section.

The reading of only one trunk at a time through the computer section is effected through the test battery relay 19 through the provision of only one supply wire of office battery through the spring sets 77, 78 and 79 for the test battery relays. It will be seen, therefore, that if a test battery relay in one of the drive sections does operate, the contacts in the spring sets 77 will break, thereby opening the connection between leads 82 and 83 as well as opening the lead 84. Thus, the remaining test battery relays in the later operated drive sections will have no battery potential and will remain inoperative until such time as the first test battery relay drops out and again supplies battery for the operation of the other drive sections.

*Cut-off of the test battery relay by the cut-off relay 21*

The cut-off relay 21 is provided with the dash pot 85 which provides for a time delay of about one second. This relay allows the test battery of relay 19 to operate for one second and then the ground is cut-off which causes the test battery relay 19 to drop out which permits negative battery to reach the test battery relays in the other drive sections of the equipment. The operation for the cut-off of ground through the test battery relay is through the breaking of the contacts in the spring set 86 of the cut-off relay which then removes the ground presented through the spring set 215 of the station chain relay which, as previously described, presents ground to the number 1 break contacts of all the impulse counters from the spring set 61 of the hold relay 15.

The cut-off relay 21 is operated through the presentation of ground through the spring set 79 of the test battery relay 19 after that relay has operated. Thus, current will flow through the unidirectional diode 87 through the coil of the cut-off relay, but, due to the operation of the dash pot 85, the relay will not operate the spring set 86 for about one second which permits operation of the apparatus in this interim. After the operation of the spring set 86, the action is as above-described and the test battery relay is caused to drop out.

The unidirectional diode 87 is in series with the ground presented through the spring set 79 through the coil of the cut-off relay 21 and prevents holding ground from appearing in the circuit after the cut-off relay has operated. Thus, the circuit through the test battery relay coil through the spring set 86, through the spring set 215 of the station chain relay 31 and the ground appearing thereon, through the first break contacts of each of the impulse counters, through the spring set 61 of the hold relay 15 is cut off. The circuit in the direction from the unidirectional diode 87 to the spring set 214 must not have ground on it after the cut-off relay is operated since the spring set 214 is the very same one that has offered ground to the lower springs of the impulse counters 25, 27 and 29 through the straps 143, 172 and 202. This ground is then presented up into the computer section and once the number has been registered and the intercept action taken, these leads must be freed of ground in order to let the hundreds, tens and units relays of the computer section drop out for use by additional drive sections.

*Intercept of the unequipped hundreds levels*

If an inward dialing operator or an extended area subscriber is dialing into the end office and dials a hundreds digit that is not equipped in the particular switching equipment, the computer intercept equipment guarding intercept numbers within this exchange is adapted to intercept this number regardless of what the remaining three digits are. Thus, once the unequipped hundreds digit is dialed into the drive section, the apparatus is set up to intercept this number after the dialing is completed for the full number through the remaining digits for the tens, units and stations. The equipment is placed in intercept after the operator or calling station finishes the full called number since the calling operator or subscriber in the majority of the dialing procedures will not hear signals from the end office until the complete number is dialed.

For the interception of the unequipped hundreds level in the telephone switching equipment, there are provided the ten single pole double throw switches in the switch set 144. Each switch is assigned the duty of guarding the hundreds level from 1 through 10 and are wired directly into the ten conductors leading from the magnetic impulse counter 25 for the hundreds digits. This intercept action for the appropriate digit of the unequipped hundreds level goes into a separate channel for audio-information and may be into a recorder announcer without the aid of operator service if desired where operator service is considered too valuable to waste on numbers which do not exist in an exchange. This condition where "no such number" may be announced and a circuit for the announcement is confined to the drive section by the proper manipulation of the appropriate switch in the switch set 144.

The operation for the unequipped hundreds feature may thus be considered by assuming that a thousand line switchboard is only equipped with the first seven hundred lines at the time of directory publication. This would leave the levels of eight, nine and zero hundreds unequipped to subscriber lines and these "no such number" conditions should be protected should these numbers be dialed by mistake. By throwing the last three switches in the unequipped hundreds set in the operated position, these levels will be intercepted and the calling party will be informed of the "no such number" condition by recording announcement. When the subscriber numbers are assigned to these three levels, the switches may be returned to the non-operated position and the computer intercept equipment will operate as a normal level and the leads from the impulse counter will be continued through the cable 146 into the computer section.

Taking eight hundred level as an example in the unequipped condition, the eighth switch in the switch set 144 for the unequipped hundreds is thrown into the operated position and the following circuit will be made. When the digit 8 is dialed, the hundreds impulse counter 25 will be pulsed eight times and the eighth line in the cable 146 between the impulse counter and the switch set 144 will have a circuit made through it from the unequipped hundreds strap 148 and thence into the spring set 154 of the tens chain relay 26 which is in the operated condition. As mentioned previously, the hundreds digit is the first one to be dialed and the tens chain relay is still in the operated position. From this spring set the circuit will be through the spring set 72 of the unequipped hundreds relay 17 into the spring set 69 of the series relay 16. Since the series relay 16 remains operated over the incoming impulses of each digit, the ground which stands upon the spring set 69 when the series relay is not operated will be removed from the hundreds impulse counter during the recording of the hundreds digit. However, after the hundreds digit has been registered, under this situation, ground is presented when the series drops out through the circuit above-described, through the impulse counter onto the strap 142, through the operated spring set 153, and thence to the make before break spring set 71 into the coil of the unequipped hundreds relay 17 to cause its operation.

The operation of the unequipped hundreds relay 17 will cause a cut-through into the second channel for intercept announcement at the completion of the dialing of the four digits of the standard telephone number. It should be noted that once the unequipped hundreds relay has operated, all of the further operations of the apparatus and any other form of intercept will be impossible except for the announcement of "no such number" with the operation of the proper relays for this announcement.

When the unequipped hundreds relay 17 operates, ground continuity is completed for the operation of the intercept hundreds relay 22 through the make before break spring set 91 and thence through the spring set 213 of the station chain relay to the operated spring set 73 of the unequipped hundreds relay upon completion of the four digit dialing. Therefore, the intercept hundreds relay 22 operates the moment the last chain relay 31 drops out after the completion of the dialing.

*Transfer of audio circuit from trunks, etc. into the audio channel for intercept of the "no such number" conditions of the unequipped hundreds*

Once the intercept hundreds relay has operated, it will be locked to ground through its make before break spring set 91, this ground being the old ground associated with the spring set 61 in the hold relay. The operation of the intercept hundreds relay 22 will then present a direct path between the trunk leads 114, 115 and 116 to the audio path for the announcement of "no such number." Thus, lead 114 will be connected with the lead 101 through spring set 108 which is not operated and through spring set 94 which has operated. Similarly, the lead 115 will be connected to the lead 102 through spring set 107 and spring set 93, while lead 116 will be connected with lead 103 through spring set 106 and spring set 92.

During this intercept action for the unequipped hundreds, the switchboard equipment behind the computer intercept apparatus is released and the condition of the called line is of no importance. By this method, a station on a party line may be intercepted even though the called line is busy, out of order or even disconnected from the frame in the local office. The computer intercept apparatus is quite fast in its intercept action so the calling station would not have time to receive a busy signal from the connector equipment and in this method the intercept number will not have to be placed upon recall by the calling station for the first attempt to reach the station will give complete intercept information.

Also, the intercept equipment need not be in the particular office where the intercept is to be furnished, but may be in the dial trunks from the connecting office serving the end office. No return trunks are required in this operation for the equipment may be in the operator office and this represents a further advantageous feature of economic import.

*Dead level operation*

Since a greater percent of dialing into any dial exchange is for numbers that are connected to working numbers, the computer intercept equipment is designed also not to follow the dialing of any number once it is determined that the digits are no possible combination for intercept. In order to provide for this condition, the dead level feature of the apparatus has been provided.

The dead level feature of this invention has been designed to obviate the pulsing of the remaining digits into the drive section once a prior digit has been registered and found to be one that will present no possible intercept condition. In this situation, the drive section will lock out and be held in the locked out condition by the calling equipment such as the trunks, selectors or connectors to prevent needless operation of the relays and wear and tear on the intercept equipment.

Operation of the drive section upon recording a dead level digit in either the hundreds, tens or units level is very much the same as the unequipped hundreds level operation in that the computer section is not employed in the circuit. An exception is that in the unequipped hundreds operation, the calling party should be intercepted and informed that "no such number" exists in the switchboard, whereas, in the dead level operation, there may be a working number in the switchboard, but it is not desired to be placed upon intercept. In the dead level operation, the remaining digits pulsed in the number do not operate the later relays and impulse counters in the drive section, since the drive section is locked out through the dialing of the dead level digits which cause this operation.

For the dead level operation, there are three sets of switches designated as 146 for the hundreds dead level, 174 for the tens dead level, and 204 for the units dead level. Each of these sets of switches, which comprise ten in number for each set, are, as previously described, connected into the associated lines of the cables 147, 175 and 205, respectively, to the switches of the hundreds impulse counter 25, the tens impulse counter 27 and the units impulse counter 29. When any one of the switches is operated to the open or on position, the computer section circuit is interrupted and a ground potential is established for the operation of the dead level relay 18. The dead level operation is, however, subject to the prior operation of the unequipped hundreds operation through the switch set 144 for the particular digit concerned. Thus, the operation of an unequipped hundreds switch for a particular hundreds digit overrides a dead level condition, since the unequipped hundreds has priority in the circuit as it is in advance of the dead level equipment in the apparatus. Therefore, no action of the dead level equipment will result when the unequipped hundreds switch has been operated.

As an example for the dead level operation, we can take the case of a switchboard fully connected with one thousand lines, all of which are equipped with line numbers and none of which are placed upon intercept. In this condition, all ten switches of the hundreds dead level set of switches 146 will be opened for the operation of the hundreds dead level condition and the following circuit will be made for the operation of the dead level relay 18.

After the hundreds impulse counter 25 has recorded the first digit and where no unequipped hundreds switches in the set 144 open, the operation is set up through the registering of the next digit as a tens digit upon the tens impulse counter 27 and the circuit completed will effect a dead level operation and the release of the impulse counter and other relays other than dead level relay 18. In this circuit, ground potential from the series relay 16, upon its drop out, will be established through spring set 69 and through the spring set 72 of the unequipped hundreds relay to the spring set 154 of the tens chain relay and thence to the common dead level strapping 149 connected to all the thirty switches in the hundreds dead level switch set 146, the tens dead level switch set 174 and the units dead level set 204. With any one of these switches open, the impulse counter for that level of digits will be opened through the line associated therewith in the appropriate cable 147, 175 and 205 and the computer section will not be connected in this digit level.

The dead level relay 18 will operate through the presentation of ground through the common strap 149 between the dead level switches which, in the case of the hundreds counter for the operation of the hundreds dead level digit, is presented to the hundreds counter 25 that has made its steps into the contact that has ground upon the top break spring and the lower make spring from the strap 142. In this action, the ground is upon the springs 153 of the tens chain relay and from there is directed into the springs of the spring set 214 of the stations chain relay which is still in its operated position. Thus, the ground potential from the operated switches in the hundreds impulse counter will be presented from the spring set 214 through the make before break spring set 74 into the dead levels relay to cause of its operation. As the dead level relay operates, it will open the pulse lead 75' from the spring set 76 and lock up through holding ground for the continued operation of the dead levels relay 18 through the operation of the make before break spring set 74 through the lead 75 which presents the holding ground from the calling equipment.

The opening of the pulse lead 75' stops all additional pulsing into the drive section and releases the remaining drive section relays upon the release of the hold relay 15, which, as previously described, is in direct control from the dial relay 14. Upon the release of the hold relay 15, the charged condenser 67 will send a surge of current through the spring set 63 into the knock down windings associated with all the impulse counters 25, 27, 29 and 32. This reversal in battery potential will realign the semi-permanent flux within the coils of the impulse counters and they will drop out and return to the non-operated position to be set up for the next incoming call from the calling equipment. The dead level relay 18 will then drop out when the calling equipment is placed in an on hook condition which interrupts the ground from the lead 75 through the coil of the dead level relay 18.

The dead level operation through the tens impulse counter 27 is effected in the same manner as the dead level operation through the hundreds impulse counter. This is because the strapping 149 is common to all the dead level switch sets 146, 174 and 204 and also because the straps 142, 172 and 202 in each of the impulse counters for the hundreds, tens and units are multipled over to the spring set 214 in the station chain relay. Similarly, the operation of the units dead level is identical to that above-described.

In the operation of the dead level feature of this invention, it will be observed, as above-described, that the dead level section is subservient to the operation of the unequipped hundreds feature. Thus, if a switch is open for any one of the unequipped hundreds switches in the switch set 144, there will be no operation of the remaining dead levels switches and the operation effected will be that for the "no such number" information.

*Operation of the two-five absorbing feature of the drive section*

In a large percentage of the inward by-directed toll dials, or operator dialing trunks, the fifth from the last digit in the number may be the X digit of the office code in the standard 2–5 numbering system and may be absorbed in the local trunks or local selectors. Thus, for the number PR5–1234, the number 5 is the X digit and may be desired to be absorbed. In order to make the drive section of the computer intercept apparatus capable of serving either a four digit local numbering plan or to absorb the X digit of the office code, the drive section may be operated with the 2–5 absorbing feature by the operation of the switch 56.

In the operation of the absorption of the X digit, the series relay 16, which functions as an excellent register of impulse series of any and all incoming digits into the drive section, is employed to absorb the X digit in the inward pulsing. With the switch 56 in the open position, the circuit from the dial relay 14 is not directly into the chain and impulse relays but is established first into the spring set 52 of the absorbing relay 12 which must first operate to complete the circuit back into the remainder of the drive section. Upon the first off hook condition of the calling equipment, the series relay 16 operates and remains operated over all the incoming pulses of the dial digit. During the time the series relay 16 is in its operated position, the ground within the spring set 69 will be presented to the make before break spring set 53 through the coil of the absorbing relay 13 to cause its operation.

As the series of impulses for any digit from the calling station is completed, the series relay 16 drops out and in so doing the ground in its spring set 68 will be presented through the spring set 54 of the operated absorbing relay 13 through the make before break spring set 51 into the coil of the absorbing relay 12 to cause its operation. Thus, as this action is completed and the relay 12 operates, the spring set 54 is closed and the by-pass circuit around the open switch 56 is completed. The apparatus is now ready for complete operation after this X digit has been absorbed.

In this manner, the absorbing feature establishes a circuit to absorb the X digit and then by-passes the circuit from the dial relay around the open switch 56 and into the chain and counting relays of the drive section. The operation thereafter is identical with that described for the four digit system where the switch 56 is closed. In the four digit system where the switch 56 is closed, the two absorbing relays will operate as above described, but will not absorb the first digit which is sent directly into the chain and counting relays.

There has been set out above a complete description of the interceptor apparatus of this invention with all its features of interception, unequipped hundreds and dead level operation and digit absorption. To suit certain operating demands and local requirements, various changes and modifications may be made in this apparatus as will be apparent to those skilled in the art. Such changes and modifications are within the teachings of this invention as defined by the claims appended hereto.

What is claimed is:

1. Telephone apparatus for intercepting calls for selected telephone numbers upon the dialing thereof, said apparatus comprising a driving means, a computing means, and an announcing means, said driving means comprising a circuit registering signal impulses corresponding to the dialed digits of said number independent of the condition of the called line, and said computing means comprising a circuit energized by the signal impulses corresponding to the selected number of the call to be intercepted to establish a circuit from the calling line into a trunk to said announcing means, said driving means further including unequipped levels switching means for establishing a separate circuit to the computing means responsive to the dialing of a selected hundreds digit where the station equipment which this apparatus serves has no such hundreds digit.

2. Telephone apparatus for intercepting calls for selected telephone numbers upon the dialing thereof, said apparatus comprising a driving means, a computing means, and an announcing means, said driving means comprising a circuit registering signal impulses corresponding to the dialed digits of said number independent of the condition of the called line, and said computing means comprising a circuit energized by the signal impulses corresponding to the selected number of the call to be intercepted to establish a circuit from the calling line into a trunk to said announcing means, said driving means further including dead level switching means for establishing a separate circuit to the computing means responsive to the dialing of a selected digit in at least one of the hundreds, tens and units levels to bypass operating components in the apparatus where none of the possible number combinations in said levels are to be intercepted.

3. Telephone apparatus for intercepting calls for selected telephone numbers upon the dialing thereof, said apparatus comprising a driving means, a computing means, and an announcing means, said driving means comprising a circuit registering signal impulses corresponding to the dialed digits of said number independent of the condition of the called line, and said computing means comprising a circuit energized by the signal impulses corresponding to the selected number of the call to be intercepted to establish a circuit from the calling line into a trunk to said announcing means, said driving means further including unequipped levels switching means for establishing a separate circuit to the computing means responsive to the dialing of a selected hundreds digit where the station equipment which this apparatus serves has no such member, said driving means further including a second switching means which is subservient to the first named switching means for establishing a separate circuit responsive to the dialing of a selected digit in at least one of the hundreds, tens and units levels to bypass operating components in the apparatus where none of the possible number combinations in said levels are to be intercepted.

4. Telephone apparatus for intercepting calls for selected telephone numbers upon the dialing thereof, said apparatus comprising a driving means, a computing means, and an announcing means, said driving means comprising a circuit registering signal impulses corresponding to the dialed digits of said number independent of the condition of the called line, and said computing means comprising a circuit energized by the signal impulses corresponding to the selected number of the call to be intercepted to establish a circuit from the calling line into a trunk to said announcing means, said computing means including jack banks adapted to receive station number patching means for connecting a circuit between the computing means and the driving means for the interception of preselected station numbers.

5. Telephone apparatus for intercepting calls for selected telephone numbers upon the dialing thereof, said apparatus comprising a driving means, a computing means, and an announcing means, said driving means comprising a circuit registering signal impulses corresponding to the dialed digits of said number independent of the condition of the called line, and said computing means comprising a circuit energized by the signal impulses corresponding to the selected number of the call to be intercepted to establish a circuit from the calling line into a trunk to said announcing means, said computing means being adapted to serve a multiplicity of separate telephone offices and said driving means being separately associated with each of the separate offices served by the computing means.

6. Telephone apparatus for intercepting calls for selected telephone numbers upon the dialing thereof, said apparatus comprising a driving means, a computing means, and an announcing means, said driving means comprising a circuit registering signal impulses corresponding to the dialed digits of said number independent of the condition of the called line, and said computing means comprising a circuit energized by the signal impulses corresponding to the selected number of the call to be intercepted to establish a circuit from the calling line into a trunk to said announcing means, said computing means being adapted to serve a multiplicity of separate telephone offices and said driving means being separately associated with each of the separate offices served by the computing means, and means for establishing priority to the computing means so that only one driving means completes a circuit through the computing means at any one time.

7. Telephone apparatus for intercepting calls for selected telephone numbers upon the dialing thereof, said apparatus comprising a driving means, a computing means, and an announcing means, said driving means comprising a circuit registering signal impulses corresponding to the dialed digits of said number independent of the condition of the called line, and said computing means comprising a circuit energized by the signal impulses corresponding to the selected number of the call to be intercepted to establish a circuit from the calling line into a trunk to said announcing means, said driving means including relays responsive to the dialing impulses from the digits in the dialed number and magnetic impulse counters for establishing a circuit for the call to the selected number through the computing means to a separate audio circuit associated with said announcing means.

8. Telephone apparatus for intercepting calls for selected telephone numbers upon the dialing thereof, said apparatus comprising a driving means, a computing means, and an announcing means, said driving means registering signal impulses corresponding to the dialed digits of said number independent of the condition of the called line, and said computing being operable by a circuit set up by the signal impulses corresponding to the selected number to be intercepted to establish a circuit from the calling line into a trunk to said announcing means, and means for absorbing the dial impulses representing a digit having a given position.

9. Telephone apparatus for intercepting calls for selected telephone numbers upon the dialing thereof, said apparatus comprising a driving means, a computing means, and an announcing means, said driving means comprising a circuit registering signal impulses corresponding to the dialed digits of said number independent of the condition of the called line, and said computing means comprising a circuit energized by the signal impulses corresponding to the selected number of the call to be intercepted to establish a circuit from the calling line into a trunk to said announcing means, said computing means including jack banks adapted to receive station number patching means for connecting a circuit between the driving means and the computing means for the interception of calls to preselected station numbers, said driving means including relays responsive to the dialing impulses from the digits in the dialed number and magnetic impulse counters for establishing a circuit representing the selected number through the jack banks and patching means in the computing means to a separate audio circuit associated with said announcing means.

10. Telephone apparatus for intercepting calls for selected telephone numbers upon the dialing thereof, said apparatus comprising a driving means, a computing means, and an announcing means, said driving means comprising a circuit registering signal impulses corresponding to the dialed digits of said number independent of the condition of the called line, and said computing means comprising a circuit energized by the signal impulses corresponding to the selected number of the call to be intercepted to establish a circuit from the calling line into a trunk to said announcing means, said driving means including relays responsive to the dialing impulses from the digits in the dialed number and magnetic impulse counters for establishing a circuit for the call to the selected number through the computing means to an audio circuit associated with said announcing means, and means in said driving means for preventing improper sequential operating of relays as the sequential dial impulses are received comprising uni-directional diodes.

11. Telephone apparatus for intercepting calls for selected telephone numbers upon the dialing thereof, said apparatus comprising a driving means, a computing means, and an announcing means, said driving means comprising a circuit registering signal impulses corresponding to the dialed digits of said number independent of the condition of the called line, and said computing means comprising a circuit energized by the signal impulses corresponding to the selected number of the call to be intercepted to establish a circuit from the calling line into a trunk to said announcing means, said driving means including unequipped levels switching means for establishing a separate circuit to the computer means responsive to the dialing of a selected hundreds digit where the equipment which this apparatus serves has no such number, said driving means further including a second switching means which is subservient to the first named switching means for establishing a separate circuit responsive to the dialing of a selected digit in at least one of the hundreds, tens and units levels to bypass operating components in the apparatus where none of the possible number combinations in said levels are to be intercepted, said computing means including jack banks adapted to receive station number patching means for connecting a circuit between the computing means and the driving means for the interception of calls to pre-selected station numbers, said unequipped levels switching means being adapted to complete said circuit for the audio announcement independently of the operation of said computing means.

12. Telephone apparatus for intercepting calls for selected telephone numbers upon the dialing thereof, said apparatus comprising a driving means, a computing means, and an announcing means, said driving means comprising a circuit registering signal impulses corresponding to the dialed digits of said number independent of the condition of the called line, and said computing means comprising a circuit energized by the signal impulses corresponding to the selected number of the call to be intercepted to establish a circuit from the calling line into a trunk to said announcing means, said driving means including unequipped levels switching means for establishing a separate circuit to the computer means responsive to the dialing of a selected hundreds digit where the station equipment which this apparatus serves has no such number, said driving means further including a second switching means which is subservient to the first named switching means for establishing a separate circuit responsive to the dialing of a selected digit in at least one of the hundreds, tens and units levels to bypass operating components in the apparatus where none of the possible number combinations in said levels are to be intercepted, said driving means including relays responsive to the dialling impulses from the digits in the dialed number and magnetic impulse counters for establishing a circuit for the call to the selected number through the computing means to an audio circuit associated with said announcing means.

References Cited in the file of this patent

UNITED STATES PATENTS

| | | |
|---|---|---|
| 2,268,397 | Hersey | Dec. 30, 1941 |
| 2,358,017 | Lomax | Sept. 12, 1944 |
| 2,718,556 | Brunberg | Sept. 20, 1955 |
| 2,764,636 | Gray | Sept. 25, 1956 |